United States Patent [19]

Purdom

[11] Patent Number: 5,577,740
[45] Date of Patent: Nov. 26, 1996

[54] THERMAL ACTIVATED SELF-RELEASING SEAL FOR BOILER

[75] Inventor: Gregory W. Purdom, Sarasota, Fla.

[73] Assignee: Loral Fairchild Corp.

[21] Appl. No.: 325,676

[22] Filed: Oct. 19, 1994

[51] Int. Cl.$^6$ ................................ F16J 9/00; B65D 90/36
[52] U.S. Cl. .................... 277/26; 220/89.2; 220/201; 220/203.08; 277/189
[58] Field of Search ............................ 277/26, 234, 236, 277/29, 189; 220/201, 203.08, 89.2, 89.4; 137/72; 116/106

[56] References Cited

U.S. PATENT DOCUMENTS

| | | | |
|---|---|---|---|
| 2,489,787 | 11/1949 | Knowlton | 220/89.4 |
| 3,179,285 | 4/1965 | De Frees | 220/89.4 |
| 3,385,468 | 5/1968 | Fleming et al. | 220/89.4 |
| 3,861,690 | 1/1975 | Englesson et al. | 277/26 |
| 3,927,791 | 12/1975 | Hershberger | 200/89 B |
| 4,195,745 | 4/1980 | Roberts et al. | 220/89.4 |
| 4,413,746 | 11/1983 | Matsutani | 220/203 |
| 4,744,382 | 5/1988 | Visnic et al. | 137/68.1 |
| 4,886,689 | 12/1989 | Kotliar et al. | 428/35.7 |
| 4,989,627 | 2/1991 | McAfee | 137/72 |

Primary Examiner—Daniel G. DePumpo
Attorney, Agent, or Firm—Joseph J. Kaliko

[57] ABSTRACT

A thermally activated self-releasing seal for a thermal mass container comprising (a) seal support located on the exterior of, separate and detached from, the container; (b) a fusible seal, attached to the seal support, to form a one piece seal when combined with the seal support; and (c) apparatus for attaching the fusible seal portion of the one piece seal to the container to cover the aperture, wherein the apparatus for attaching is located on the exterior of and is separate from the container. According to a preferred embodiment of the invention the apparatus for attaching is an adhesive, such as a room temperature vulcanizing rubber (an RTV), a two part epoxy, or the like; having the property that heat is not required in order to accomplish the attachment of the fusible seal portion of the one piece seal to the container. The invention is particularly useful in sealing smooth walled thermal mass containment vessels, joining fusible seals to containment vessels made of incompatible materials from a bonding point of view, etc. Furthermore, the invention is useful for sealing thermal mass containers incorporated into state of the art flight data recorders, which use the thermal mass to protect sensitive electronic components from fire damage.

26 Claims, 2 Drawing Sheets

THERMAL ACTIVATED SELF-RELEASING SEAL FOR BOILER

BACKGROUND OF THE INVENTION

1. Field of the Invention

The invention relates generally to thermally activated, self-releasing seals, valves, plugs and the like (hereinafter referred to as seals), used to retain a fluid within a containment vessel (sometimes referred to hereinafter as a "thermal mass container") until such time as the fluid stored in the vessel is heated to a predetermined temperature. Once the predetermined temperature is reached, a thermally activated self-releasing seal will release (open), allowing the fluid in the containment vessel to escape.

The invention more particularly relates to a thermally activated self-releasing seal that may, for example, be used as a boiler plug for a boiler (which is an example of thermal mass container) incorporated into aircraft flight recorders. An example of such a boiler is described in copending patent application serial number (Attorney Docket LRL-001), entitled "Flight Crash Survivable Storage Unit With Boiler For Flight Recorder Memory", filed on Oct. 5, 1994, and assigned to the same assignee as the instant invention.

The present invention specifically relates to methods and apparatus for sealing an aperture in a thermal mass container using a one piece, thermally activated, self-releasing seal which is affixed to the exterior of the container using, for example, an adhesive to actually create the desired seal by releasably securing the one piece structure in place.

The seal contemplated by the invention is formed as a combination of elements, namely: (a) a seal support means which is located on the exterior of, and is "separate and detached" from the container (where "separate and detached" is defined herein to mean not directly attached to the container at any time); (b) a fusible seal which is attached to the seal support means to form the one piece seal when combined with the seal support means (the fusible seal material, according to a preferred embodiment of the invention, being in a non-fused state after the one piece seal is formed); and (c) means for attaching the fusible seal portion of the one piece seal to the container (using, for example, the aforementioned adhesive), to cover an aperture in the container, wherein the means for attaching is located on the exterior of and is separate from the container.

The invention also relates to (a) processes for manufacturing sealed fluid containment vessels having a thermally activated safety seal; and (b) processes for fabricating such seals in circumstances where the materials used for the seal and containment vessel are incompatible for bonding purposes.

2. Description of the Related Art

The prior art is replete with patents directed to self-releasing sealing mechanisms which are thermally activated.

Examples include U.S. Pat. No. 1,973,182, to Shaw, entitled "Heat Releasable Drainage Means", issued Sep. 11, 1934; U.S. Pat. No. 3,168,210, to Williams, entitled "Safety Feature In Pressurized Containers", issued Feb. 2, 1965; U.S. Pat. No. 4,147,272, to Stenner et al., entitled "Pressure Relief Device", issued Apr. 3, 1979; U.S. Pat. No. 4,195,745, to Roberts et al., entitled "Thermally Sensitive Pressure Release Assembly For Sealed Pressurized Vessel", issued Apr. 1, 1980; U.S. Pat. No. 4,232,796, to Hudson, Jr., et al., entitled "Thermal Release Plug For A Fabricated Pressure Vessel", issued Nov. 11, 1980; U.S. Pat. No. 4,690,295, to Wills, entitled "Pressure Container With Thermoplastic Fusible Plug", issued Sep. 1, 1987; U.S. Pat. No. 4,744,383, to Visnic et al., entitled "Thermally Activated Valve", issued May 17, 1988; U.S. Pat. No. 4,899,777, to Stone et al., entitled "Thermally Activated Pressure Relief Plug", issued Feb. 13, 1990; U.S. Pat. No. 5,154,201, to Yanagihara et al. entitled "Method Of Manufacturing A Sealed Vessel Having A Safety Valve", issued Oct. 13, 1992; and U.S. Pat. No. 5,193,046, to Lemke et al., entitled "Information Recording Apparatus With A Liquid Bearing", issued Mar. 9, 1993.

The Shaw patent is directed to heat releasable drainage means for automobile gasoline tanks. Shaw teaches the use of a fusible plug (a seal) installed with a threaded nipple into a wall of the liquid container (a gasoline tank). The seal is relatively thick and the container wall is likewise thick enough to accommodate the installation of the plug.

Shaw typifies the teachings of many prior art references that are directed to installing a plug, seal, valve, etc., within the wall of the containment vehicle, generally referred to hereinafter as "internal seals".

In addition to requiring threading to attach his fusible drain plugs (seals) to the container, Shaw separates his fusible material from the flammable contents of the gas tank by use of a sheet metal disc for safety purposes.

It would be desirable, particularly in view of the teachings of Shaw, to provide less complicated thermally activated self-releasing sealing mechanisms, i.e., provide methods and apparatus for sealing an aperture in a thermal mass container which do not require internal installation within the container wall, thread fabrication and engagement, thick container wall structures provided only for the sake of containing the desired seal, devices to separate the fusible seal from the containers fluid contents, etc.

The Williams patent is generally directed to safety features for pressurized containers such as the type used to store and dispense various substances such as insecticides, deodorizing compounds and the like. In particular, Williams teaches the use of a soft solder fusible seal, attached in a fused state directly to the outside of a pressurized container, which is thermally released when the container reaches a predetermined temperature.

The Williams patent typifies an "external seal", which is the same type of seal contemplated by the present invention. An external seal is defined herein to be a seal affixed to the outside a fluid containment vehicle; as opposed to the aforementioned internal seals which penetrate or are installed with a wall of the containment vehicle.

Williams' teaching of attaching the fusible seal in a fused state, directly to the outside of a pressurized container, can be problematic in many applications. For example, if the containment vessel is first filled using the vent hole being sealed (which is the case in, for example, the flight recorder application referred to hereinbefore in order to minimize the number of container openings, reduce manufacturing costs, conserve save space, etc.), undesirable fluid loss may occur from the heating that takes place when the fusible seal is directly attached to the container in a fused state.

Furthermore, where the fluids contained in the containment vessel are volatile (e.g., gasoline, etc.), the heating required to affix the external seal in the manner contemplated by Williams would be dangerous.

Accordingly, it would be desirable to provide an alternative external thermally activated self-releasing sealing mechanism that includes a fusible material that may be attached to the containment vessel in a non-fused state for the reasons set forth hereinabove.

Visnic et al., U.S. Pat. No. 4,744,383, issued May 17, 1988, is directed to a thermally activated valve which is physically attached to a protrusion on the container being sealed. The valve includes and supports a fusible material which melts and thereby opens the valve at a predetermined temperature. The fusible seal itself is not directly attached to the container in any fashion, being retained by the valve structure which supports the fusible seal.

Since the mechanism for supporting Visnic et al's. fusible seal is itself directly attached to (or alternatively within) a container protrusion, it would be difficult, if not impossible, for the Visnic et al. valve to be used in conjunction with or on "smooth walled" containers. As used herein the term "smooth walled" container means a container not having any protrusions (or recesses) onto which (or within which) a seal included in a valve (such as the valve described by Visnic et al.) may be affixed. An example of a smooth walled container is the container used in the fabrication of aforementioned flight recorder boiler described in the incorporated copending patent application.

It may also be seen that the Visnic et al. valve is a combination of machined pieces that are relatively complex to integrate and manufacture.

Accordingly, it would be desirable to provide a relatively simple, low cost, one piece design, thermally activated self-releasing sealing mechanism that is suitable for use on smooth walled containment vessels, such as the boilers used in the aforementioned flight recorder application.

The aforementioned patents to Stenner et al.; Roberts et al.; Hudson, Jr. et al.; Wills; Stone and Lemke et al., are all further examples of the above described "internal" type seal (such as the one taught by Shaw).

In particular, (1) Stenner et al. simply shows the use of a solder plug that is located within a container wall; (2) Roberts et al. teaches a pressure relief assembly that is thermally sensitive; but does not use a fusible seal for activation purposes; (3) Hudson Jr., et al. teaches the use of a steel ball trapped within a well formed in the wall of a fluid containment vessel, to serve as a seal; (4) Wills teaches the use of a thermoplastic fusible plug within the walls of a container for providing pressure relief; (5) Stone teaches the use of a thermally activated pressure relief plug for mounting within a port on a pressurized structure; and (6) Lemke et al. teaches the use of an internal type seal in an information recording device context (in particular, a flight recorder), where the sealing means (located within a chamber wall) is a solder type seal which melts upon exposure to heat allowing a fluid stored within the chamber to vent.

All of these patents exemplify the state of the art, particularly the art of using internal type seals and seals used in the flight recorder context; and further highlight the need for a simple, external type, thermally activated self-releasing seal which is suitable for use in conjunction with smooth walled containers, suitable for use in environments where space limitations are critical, etc.

Finally, the patent to Yanagihara et al. further exemplifies the state of the art with respect to external type seals (like the seal taught by Williams discussed hereinbefore). In particular, Yanagihara et al. describes a container which has a cavity, located in a concave surface of a containment vessel, for retaining a fusible material which serves as a thermally activated self-releasing seal. The fusible material is directly attached to (i.e., not separate from) the container wall (like the seal taught in the Williams patent) and must first be melted to form the attachment directly thereto. Accordingly, the same improvements desired with respect to the sealing mechanism taught by Williams are desirable with respect to the teachings of Yanagihara et al.

In view of the present state of the art relating to thermally activated self-releasing seals, as exemplified by the patents discussed hereinabove, it would be desirable to be able to provide a new type of thermally activated self-releasing seal exhibiting the desirable properties set forth hereinbefore.

SUMMARY OF THE INVENTION

Accordingly, it is a general object of the invention is to provide a relatively simple, low cost, one piece design, thermally activated self-releasing sealing mechanism that may be used as a container safety valve, fluid flow control valve, etc.

It is a further general object of the invention to provide methods and apparatus for sealing an aperture in a thermal mass container using a one piece, thermally activated, self-releasing seal which is affixed to the exterior of the container using, for example, an adhesive to actually create the desired seal by releasably securing the one piece structure in place.

It is a specific object of the invention to provide methods and apparatus for sealing an aperture in a smooth walled thermal mass container.

It is a further specific object of the invention to provide methods and apparatus for sealing an aperture in thermal mass containers that do not have walls thick enough to provide for the internal installation of the sealing mechanism within the container wall.

Yet another object of the invention to provide methods and apparatus for fabricating a thermally activated self-releasing seal without requiring a threaded seal engagement mechanism.

Still another object of the invention is to provide methods and apparatus for realizing an external thermally activated self-releasing sealing mechanism that includes a fusible material that may be attached to the containment vessel in a non-fused state.

A still further object of the invention is to provide methods and apparatus for solving the problem of being able to seal a hole in a container which is filled with a fluid (for example, water), and have the seal thermally release at a temperature within a few degrees of the boiling temperature of that fluid.

In connection with the sealing operation referred to in the previous object, it is also an object of the invention to provide methods and apparatus which prevent loss of thermal mass during the process of affixing a thermally activated self-releasing seal to a containment vessel in which the thermal mass is stored.

Further yet, it is a specific object of the invention to provide methods and apparatus for fabricating a thermally activated self-releasing seal that may be used in conjunction with new flight recorder designs, such as the flight recorder described in the aforementioned incorporated copending patent application, for the purposes stated therein.

According to the invention methods and apparatus are set forth for sealing an aperture in a thermal mass container using a one piece, thermally activated, self-releasing seal which is affixed to the exterior of the container using an adhesive (to actually create the desired seal by putting the one piece structure in place).

The seal contemplated by one aspect of the invention comprises: (a) seal support means located on the exterior of, separate and detached from, the container; (b) a fusible seal, attached to the seal support means, to form a one piece seal when combined with the seal support means; and (c) means for attaching the fusible seal portion of the one piece seal to the container to cover the aperture, wherein the means for attaching is located on the exterior of and is separate from the container.

According to a preferred embodiment of the invention the means for attaching is an adhesive, such as a room temperature vulcanizing rubber (an RTV), a two part epoxy, or the like; having the property that heat is not required in order to accomplish the attachment of the fusible seal portion of the one piece seal to the container.

According to an alternate characterization of the invention, the fusible seal portion of the one piece seal is attached to the container in a non-fused state. The seal is released at a temperature that is approximately the boiling temperature of the thermal mass contained within the thermal mass container, allowing the thermal mass to escape from the previously seal container.

The invention also contemplates methods for fabricating a thermally activated self-releasing seal for a thermal mass container, the container including an aperture for introducing a thermal mass therein, wherein the self-releasing seal enables pressure to be relieved (and thermal mass to escape) from the container when the thermal mass is heated to a predetermined temperature, comprising the steps of: (a) attaching a fusible seal to seal support means to form a one piece seal combination; and (b) attaching the combination to the thermal mass container, to seal the aperture, utilizing an adhesive having the property that heat is not required in order to accomplish the attachment of the fusible seal portion of the one piece seal to the container.

An alternate characterization of the invention in the context of a method for fabricating a thermally activated self-releasing seal for a thermal mass container, the container including an aperture for introducing a thermal mass therein, wherein the self-releasing seal enables pressure to be relieved (and thermal mass to escape) from the container when the thermal mass is heated to a predetermined temperature, comprises the steps of: (a) attaching a fusible seal to seal support means to form a one piece seal combination; and (b) attaching the combination to the thermal mass container, to seal the aperture, when the fusible seal portion of the one piece seal is in a non-fused state.

Further aspect of the invention are directed to (a) a method of (process for) manufacturing a sealed thermal mass container for storing a thermal mass; (b) processes for fabricating such seals in circumstances where the materials used for the seal and containment vessel are incompatible for bonding purposes; and (c) a thermally activated self-releasing safety seal for a boiler incorporated into an aircraft flight recorder, per se.

The invention features the ability to use a simple, reliable, low cost, one piece thermally activated self-releasing seal in any number of applications, including applications where the one piece seal has a fusible seal portion that is incompatible (for bonding purposes) with the container to be sealed; applications where smooth walled containers are being sealed; applications having stringent space and high performance requirements, such as seals used in aircraft flight recorders of the type described in the incorporated copending patent application, etc.

These and other objects, embodiments and features of the present invention and the manner of obtaining them will become apparent to those skilled in the art, and the invention itself will be best understood by reference to the following Detailed Description read in conjunction with the accompanying Drawing.

DETAILED DESCRIPTION

For the sake of illustration only, the present invention will be described in the context of the aircraft flight recorder Flight Crash Survivable Storage Unit (FCSSU) boiler; itself described in detail in the incorporated copending patent application. Those skilled in the art will readily appreciate that the FCSSU boiler context is but one example of where the thermally activated self-releasing seal described herein may be beneficially used. Accordingly, the illustrative embodiment of the invention set forth with reference to the FCSSU boiler is not in any way intended to limit the scope or spirit of the present invention.

The boiler discussed in the incorporated copending patent application is an example of a thermal mass containment vessel (sometimes referred to herein as a thermal mass container). An illustrative thermal mass discussed in the incorporated copending patent application is water. The water is a phase change material (a PCM) which has the potential for causing dangerous pressure build up in the boiler as applied heat turns the water to steam.

The boiler described in the incorporated copending patent application is a smooth walled container which includes an aperture for filling the container with, in the illustrative example being set forth herein, the water.

A seal is applied over the aperture when the FCSSU is fabricated, prior to being placed into service. If heat from a fire that often follows an aircraft crash brings the water in the boiler close to a boil; it is desirable for the aforementioned seal to be released to reduce internal boiler pressure and let the PCM escape from the boiler (thru what was originally the boiler fill hole), and surround (bathe) sensitive electronic components in a chamber outside the boiler. As taught in the incorporated copending patent application this process helps to protect the sensitive electronic components from being damaged by the high heat typically associated with a fire.

In other words, it is desirable for the seal to "melt" and self-release when the temperature in the boiler comes close to the PCM phase change temperature of the fluid contained in the containment vessel.

Figure 1A:
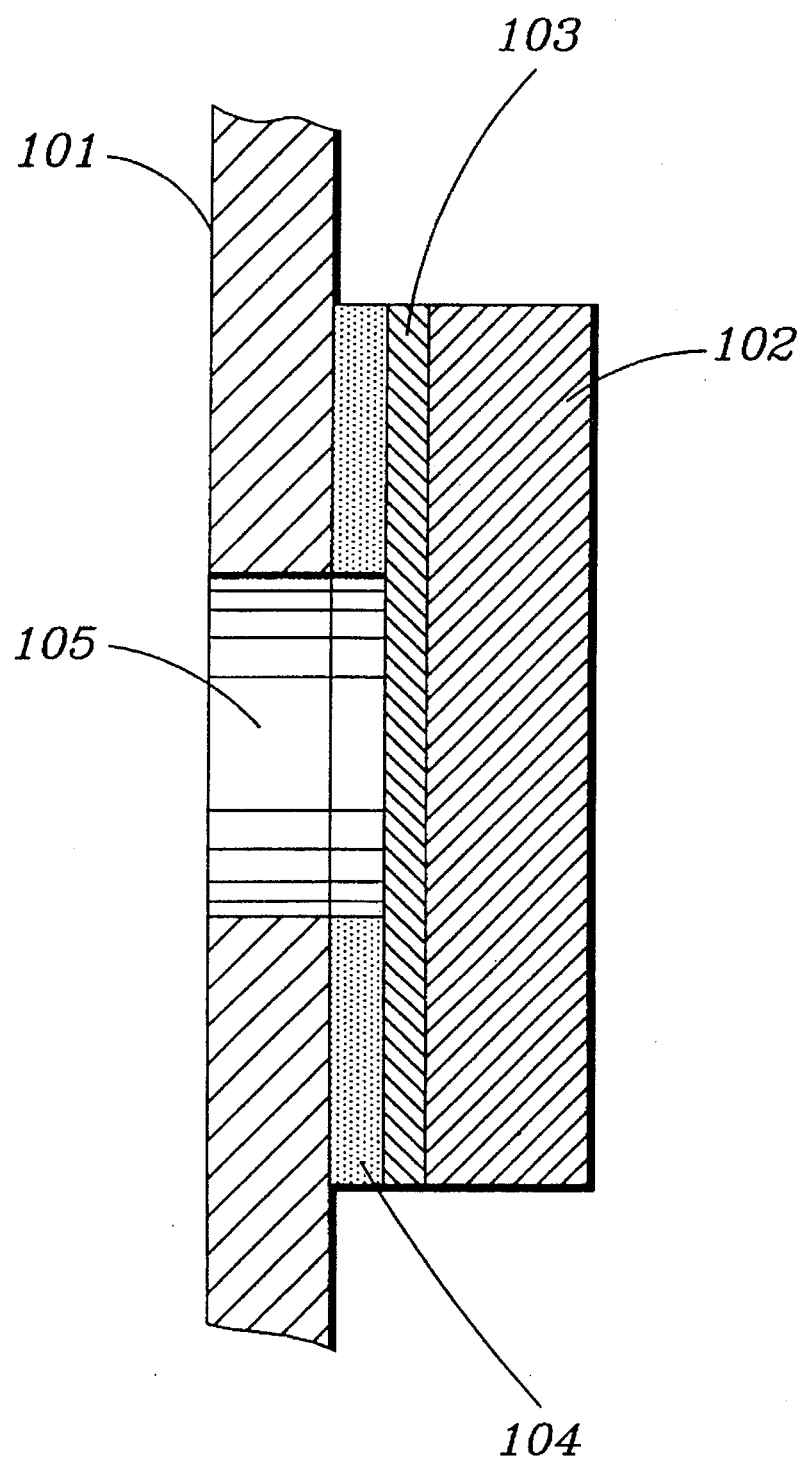
FIG. 1A is a sectional view of an illustrative embodiment of a thermally activated self-releasing seal of the type contemplated by the invention.

A thermally activated self-releasing seal for use in the aircraft flight recorder context and in many other applications (such as those illustrated by the prior art patents discussed hereinbefore), may be realized using a seal such as the one depicted in FIG. 1A.

As indicated hereinabove, FIG. 1A is a sectional view of an illustrative embodiment of a thermally activated self-releasing seal of the type contemplated by the invention.

In particular, FIG. 1A depicts a layer of fusible material (103), also referred to herein as a "fusible seal"; affixed to a disc (102), which is used to support the fusible seal.

Fusible material 103 may, for example, be realized by using a bismuth alloy. One such alloy that has been found suitable consists essentially of 46% bismuth; 20% lead; and 34% tin. All that is required by the invention is that the fusible material chosen melt at a predetermined temperature which is suited to the application where the fusible material is being employed.

A suitable disc 102, according to one embodiment of the invention well suited for use in the illustrative FCSSU application, is a thin metal disc that will allow the fusible material (like the exemplary low temperature bismuth alloy), to adhere to it. Suitable discs have been fabricated using a copper alloy and alternatively a coated brass plate, although these examples by no means limit the choices for a suitable fusible material (seal) support mechanism.

Furthermore, according to the illustrative embodiment of the invention depicted in FIG. 1A, the combination of fusible seal 103 and support disc 102 is what is referred to herein as the "one piece seal". Those skilled in the art will readily appreciate that the one piece seal may be fabricated separately, i.e., before undertaking the sealing operation per se. This means that, for example, the illustrative bismuth alloy can be heated and made to adhere to the metal disc without the risk of subjecting the thermal mass container or its contents to the heat required to attach fusible seal 103 to disc 102.

Referring further to FIG. 1A, it may be seen that, according to one embodiment of the invention, the one piece seal (fusible seal 103 and disc 102 combined) is attached to wall 101 of a thermal mass container (such as the boiler described in the previously incorporated copending patent application), via a layer of material 104, referred to herein as a "means for attaching" the fusible seal to the container. Layer 104, according to differing aspects of the invention, may be, for example, an adhesive or other material suited for attaching the fusible seal to the container.

According to a preferred embodiment of the invention, the means for attaching the fusible seal to the container is an adhesive, such as a room temperature vulcanizing rubber (an RTV), a two part epoxy, and the like. The exemplary materials have the property that heat is not required in order to accomplish the attachment of the fusible seal portion of the one piece seal to the container.

It should be further noted with reference to FIG. 1A that a passageway (105) is shown extending through layer 104 and container wall 101.

According to the depicted illustrative embodiment of the invention depicted in FIG. 1A, passageway 105 is sealed shut until such time as fusible material 103 "melts" under conditions such as those described hereinbefore.

After fusible material 103 melts, the seal is released (i.e., the one piece seal is no longer sealing the container shut), and passageway 105 is opened allowing the contents of the container to escape which, as stated hereinabove, is the desired result in the illustrative FCSSU boiler application.

Figure 1B:
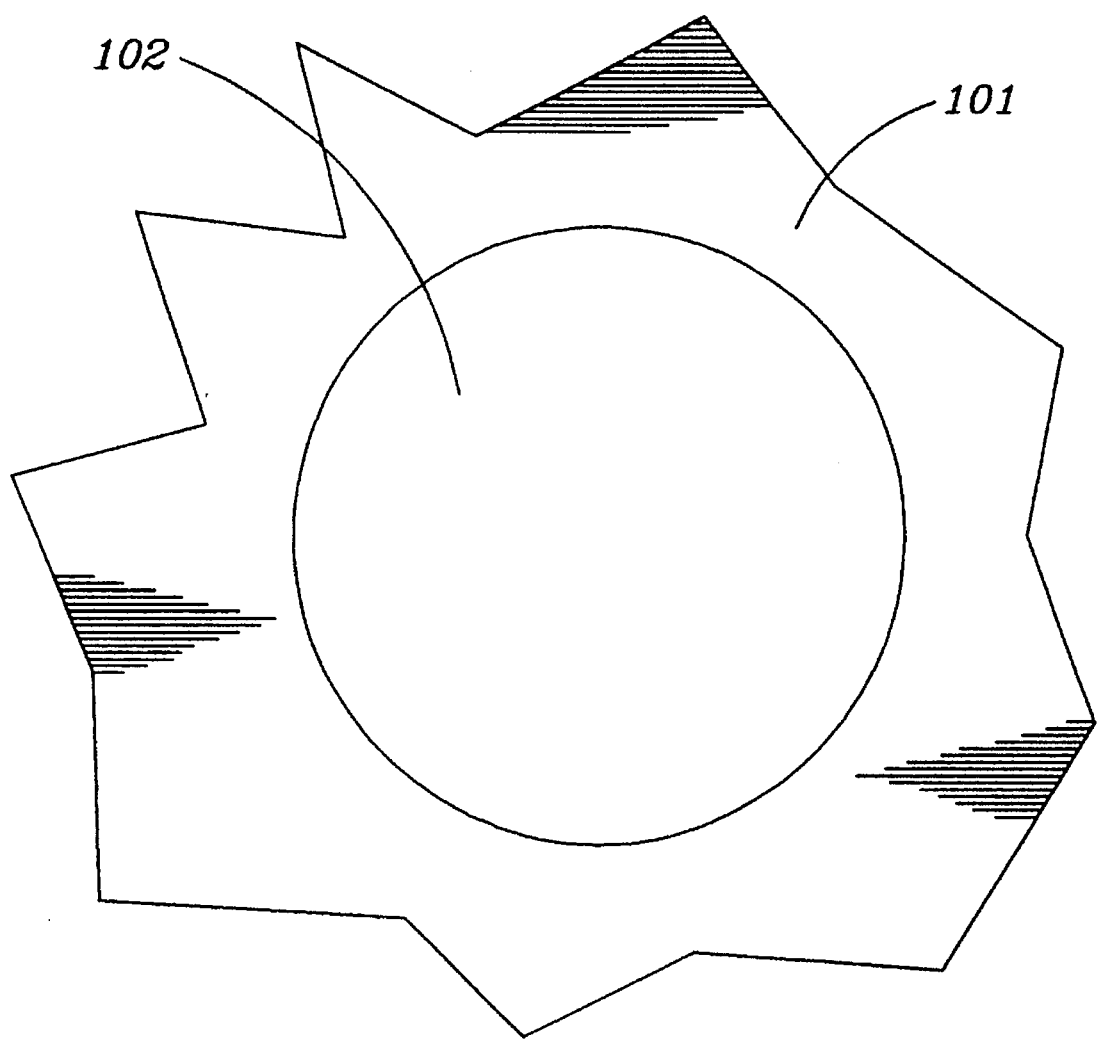
FIG. 1B is a top view of the disc shown in FIG. 1A looking down on the aforementioned container wall, also shown in FIG. 1A.

Reference should be made to FIG. 1B which, as indicated hereinbefore, is a top view of the disc shown in FIG. 1A looking down on the aforementioned container wall. FIG. 1B illustrates that it is desirable for disc 102 to be large enough to completely cover the aperture in container wall 101 to thereby completely seal the aperture (not in view in FIG. 1B), when the one piece seal (thermal seal 103/disc 102 combination) is attached to the container using the illustrative adhesive (means for attaching) layer 104 shown in FIG. 1A.

It should be noted that the process for applying the thermally activated self-releasing seal described herein above, using the exemplary adhesive to attach the fusible seal indirectly to the container, allows incompatible materials, like a solder fusible seal and an aluminum container can, to be used together in the same application.

It should also be noted that using the container fill hole as a vent hole allows for ease in manufacturing a containment vessel/seal combination. In particular, the sealing mechanism does not require a significant amount of space or a thick walled container to house valves, etc., as required by many of the prior art references discussed hereinbefore with reference to the background of the invention. The simplicity of the sealing mechanism described hereinabove makes it inherently reliable.

According to a preferred embodiment of the invention, a suitable process for manufacturing the aforementioned containment vessel/seal combination (i.e., a method of manufacturing a sealed thermal mass container for storing a thermal mass), wherein the method of manufacturing prevents the loss of stored thermal mass when affixing a thermally activated self-releasing seal to the container, comprises the steps of: (a) forming an aperture in the container; (b) introducing the thermal mass to be stored into the container through the aperture; (c) attaching a fusible seal to seal support means to form a one piece seal combination; and (d) attaching the combination to the thermal mass container, to seal the aperture, utilizing an adhesive having the property that heat is not required in order to accomplish the attachment of the fusible seal portion of the one piece seal to the container.

As indicated hereinbefore, the invention features the ability to use a simple, reliable, low cost, one piece thermally activated self-releasing seal in any number of applications, including applications where the one piece seal has a fusible seal portion that is incompatible (for bonding purposes) with the container to be sealed; applications where smooth walled containers are being sealed; applications having stringent space and high performance requirements, such as seals used in aircraft flight recorders of the type described in the incorporated copending patent application, etc.

What has been described in detail hereinabove are methods and apparatus meeting all of the aforestated objectives. As previously indicated, those skilled in the art will recognize that the foregoing description has been presented for the sake of illustration and description only. It is not intended to be exhaustive or to limit the invention to the precise form disclosed, and obviously many modifications and variations are possible in light of the above teaching.

The embodiments and examples set forth herein were presented in order to best explain the principles of the instant invention and its practical application to thereby enable others skilled in the art to best utilize the instant invention in various embodiments and with various modifications as are suited to the particular use contemplated.

It is, therefore, to be understood that the claims appended hereto are intended to cover all such modifications and variations which fall within the true scope and spirit of the invention.

What is claimed is:

1. Apparatus for sealing an aperture in a thermal mass container containing a thermal mass, comprising:
    (a) a seal support located on the exterior of, separate and detached from, said container;
    (b) a fusible seal, attached to said seal support, to form a one piece seal when combined with said seal support, wherein the fusible portion of said one piece seal is operative to release said one piece seal when said thermal mass is heated to a predetermined temperature; and (c) means for attaching the fusible seal portion of said one piece seal to said container to cover said aperture, wherein the means for attaching is located on the exterior of and is separate from said container.

2. Apparatus as set forth in claim 1 wherein said means for attaching is an adhesive.

3. Apparatus as set forth in claim 2 wherein said adhesive has the property that heat is not required in order to accomplish the attachment of the fusible seal portion of said one piece seal to said container.

4. Apparatus as set forth in claim 3 wherein a passageway exists through said adhesive between said aperture and the fusible seal portion of said one piece seal.

5. Apparatus as set forth in claim 1 wherein said seal support is a thin metallic disc.

6. Apparatus as set forth in claim 1 wherein said fusible seal is soldered to said seal support.

7. Apparatus as set forth in claim 1 wherein said fusible seal portion of said one piece seal is attached to said container in a non-fused state.

8. Apparatus as set forth in claim 1 wherein said fusible seal is a bismuth alloy.

9. Apparatus as set forth in claim 1 wherein said fusible seal and said container are fabricated from materials which are incompatible for bonding purposes.

10. Apparatus as set forth in claim 1 wherein said one piece seal is released at a temperature that is approximately the boiling temperature of said thermal mass.

11. A thermally activated self-releasing seal for sealing a smooth walled fluid containment vessel containing a fluid, comprising:

(a) a seal support;

(b) a fusible seal, attached to said seal support, to form a one piece seal when combined with said seal support, wherein the fusible portion of said one piece seal is operative to release said one piece seal when said thermal mass is heated to a predetermined temperature; and (c) means for attaching the fusible seal portion of said one piece seal to said smooth walled fluid containment vessel container, wherein the means for attaching is located on the exterior of and is separate from said vessel.

12. Apparatus as set forth in claim 11 wherein said means for attaching is an adhesive.

13. Apparatus as set forth in claim 12 wherein said adhesive has the property that heat is not required in order to accomplish the attachment of the fusible seal portion of said one piece seal to said vessel.

14. Apparatus as set forth in claim 11 wherein said fusible seal and said fluid containment vessel are fabricated from materials which are incompatible for bonding purposes.

15. Apparatus as set forth in claim 11 wherein said thermally activated self-releasing seal is released at a temperature that is approximately the boiling temperature of said fluid.

16. A thermally activated self-releasing safety seal for a boiler incorporated into an aircraft flight recorder, wherein said boiler includes an aperture for introducing the thermal mass to be stored in said boiler, comprising:

(a) a seal support located on the exterior of, separate and detached from, said boiler;

(b) a fusible seal, attached to said seal support, to form a one piece seal when combined with said seal support, wherein the fusible portion of said one piece seal is operative to release said one piece seal when said thermal mass is heated to a predetermined temperature; and (c) means for attaching the fusible seal portion of said one piece seal to said boiler to cover said aperture, wherein the means for attaching is located on the exterior of and is separate from said boiler.

17. Apparatus as set forth in claim 16 wherein said means for attaching is an adhesive having the property that heat is not required in order to accomplish the attachment of the fusible seal portion of said one piece seal to said boiler.

18. Apparatus as set forth in claim 17 wherein a passageway exists through said adhesive between said aperture and the fusible seal portion of said one piece seal.

19. Apparatus as set forth in claim 16 wherein said seal support is a thin metallic disc and said fusible seal is soldered to said disc.

20. Apparatus as set forth in claim 16 wherein said fusible seal portion of said one piece seal is attached to said boiler in a non-fused state.

21. Apparatus as set forth in claim 16 wherein said fusible seal is a bismuth alloy.

22. Apparatus as set forth in claim 16 wherein said one piece seal is released at a temperature that is approximately the boiling temperature of the thermal mass contained within said boiler.

23. Apparatus as set forth in claim 16 wherein said boiler is a smooth walled containment vessel.

24. Apparatus as set forth in claim 1 wherein said one piece seal, once attached to said container, is operatively released therefrom without rupturing when said thermal mass is heated to said predetermined temperature.

25. Apparatus as set forth in claim 11 wherein said one piece seal, once attached to said vessel, is operatively released therefrom without rupturing when said thermal mass is heated to said predetermined temperature.

26. Apparatus as set forth in claim 11 wherein said one piece seal, once attached to said boiler, is operatively released therefrom without rupturing when said thermal mass is heated to said predetermined temperature.

* * * * *